United States Patent

[11] 3,624,012

[72] Inventor Leslie C. Case
    14 Lockeland Road, Winchester, Mass. 01890
[21] Appl. No. 878,895
[22] Filed Nov. 21, 1969
[45] Patented Nov. 30, 1971

[54] PROCESS FOR PREPARING HALOGENATED COPOLYMERS OF OLEFINICALLY UNSATURATED CYCLOALIPHATIC MONOANHYDRIDES WITH CYCLIC MONOETHERS
    20 Claims, No Drawings

[52] U.S. Cl............................................... 260/17.4,
    260/47 R, 260/47 UA, 260/73, 260/78.4 EP, 260/78.5 T
[51] Int. Cl.............................................. C08f 3/70, C08f 27/02

[50] Field of Search............................................ 260/78.4
    EP, 78.5 T, 17.4, 47 R, 47 UA

[56] References Cited
    UNITED STATES PATENTS
    3,254,060  5/1966  Connolly et al...............  260/78.4 EP
    3,464,958  9/1969  Matsuura et al ...............  260/78.4 EP Primary Examiner—William H. Short
Assistant Examiner—L. M. Phynes ABSTRACT: An improved two-step process for the preparation of halogen-containing copolymers with hydroxylic and/or carboxylic acid end groups is described. This process involves the addition of halogen to polyester-ether copolymers derived from olefinically unsaturated cycloaliphatic dicarboxylic acid monoanhydrides.

PROCESS FOR PREPARING HALOGENATED COPOLYMERS OF OLEFINICALLY UNSATURATED CYCLOALIPHATIC MONOANHYDRIDES WITH CYCLIC MONOETHERS

CROSS-REFERENCES TO RELATED APPLICATIONS

This application is related to U.S. Pat. applications Ser. No. 665,005, filed Aug. 21, 1967 now U.S. Pat. No. 3,483,169, granted Dec. 9, 1969, and earlier applications, now abandoned, and U.S. Pat. Nos. 3,378,527, 3,382,217, and 3,454,530.

BACKGROUND OF THE INVENTION

1. Field of the Invention

This invention relates to the preparation of halogen-containing binary and ternary copolymers related to the classes broadly recognized as polyester, polyether and polyacetal compositions. More specifically, this invention is concerned with an improved two-step process for preparing those copolymers which possess, incorporated into the polymer chain, monomer residues derived from halogenated cycloaliphatic dicarboxylic acid monoanhydrides.

2. Description of the Prior Art

Halogen-containing polymers have attained importance in the preparation of flame-retardant compositions and have been used extensively in the preparation of such end products as flame-retardant paints, polyester resins, polyurethanes, epoxy resins, etc. The incorporation of halo radicals into the polymer structure is generally accomplished through the use of halo-substituted monomers in the preparation of the polymer. The ready availability of monomers possessing not only suitable functional groups for polymer formation but also significant amounts of halogen substituents is limited, however. The choice of monomer becomes even more limited as the atomic weight of the halo radical substituent increases from chloro to bromo to iodo. Moreover the preparation of such monomers is often involved and does not proceed in 100 percent yield, and the resulting materials are quite expensive in comparison to their unhalogenated counterparts. Another obstacle has been the fact that such halogenated monomers often react sluggishly in conventional polymerization reactions, such as polycondensation for example, requiring special reaction conditions, high reaction temperatures, or exceedingly long reaction times, resulting in dark polymers with viscosities too high to be useful in many applications.

U.S. Pat. application Ser. No. 665,005 and prior applications, now abandoned, as well as U.S. Pat. Nos. 3,382,217 and 3,454,530 describe the preparation of novel polyfunctional binary copolymers which have surprisingly low viscosities yet which may possess incorporated into the polymer chains halo-substituted monomer residues in significant amounts. These copolymers are characterized in that essentially linear polymer chains carrying at one chain end terminal radicals selected from the group consisting of hydroxyl and carboxylic acid radicals emanate in branchlike fashion from and are joined through ester and ether linkages at the other chain end to a central core consisting essentially of a residue derived from a polymerization starter selected from the group consisting of water, hydrogen-containing inorganic acids capable of effecting the ring-opening reaction of cyclic ethers without destructive decomposition, and organic compounds having at least one radical selected from the group consisting of hydroxyl, carboxyl and sulfhydryl radicals, the said polymer chains being composed of (A) polyether segments of the formula — (O—R)$_n$— wherein R is an alkylene radical selected from the group consisting of 1,2-alkylene and 1,3-alkylene radicals and n is a positive integer varying from one to ten with the average value of n being at least 1.5, and (B) ester units of the formula

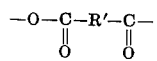

wherein R′ is a hydrocarbon radical of from two to twelve carbon atoms and from zero to six halogen substituents selected from the group consisting of chloro and bromo radicals, and is derived from a cyclic dicarboxylic acid monoanhydride of the formula

U.S. Pat. 3,378,527 describes ternary copolymers in which the polymer chains in addition to units (A) and (B) also contain acetal units (C) of the general formula

wherein R″ is a hydrocarbon radical attached to the carbon atom of an aldehyde group.

These copolymers are prepared by copolymerizing in the absence of strongly basic catalysts at elevated temperatures and, generally, superatmospheric pressures, cyclic dicarboxylic acid monoanhydrides and cyclic monoethers having oxygen located in a heterocyclic ring of three to four members, and optionally, an aldehyde, in the presence of a polymerization starter selected from the group consisting of water, hydrogen-containing inorganic acids capable of effecting the ring-opening of cyclic monoethers without destructive decomposition, and organic compounds having at least one radical selected from the group consisting of hydroxyl, carboxyl and sulfhydryl radicals. Halogen-containing polymers are readily obtained in this process by using such halo-substituted monomers as epihalohydrins, haloalkyl-substituted aldehydes and halogenated anhydrides. Representative of the latter are for example such anhydrides as tetrachlorophthalic anhydride, tetrabromophthalic anhydride, 1,4,5,6,7,7-hexachlorobicyclo(2,2,1)-5-heptenedicarboxylic acid anhydride, also known as Chlorendic anhydride, 4,5-dibromocyclohexane-1,2-dicarboxylic acid monoanhydride, 4,5-dichlorocyclohexane-1,2-dicarboxylic acid monoanhydride, 5,6-dichloronorbornane-2,3-dicarboxylic acid anhydride and similar materials.

A few of these halogenated anhydrides are articles of commerce, other, and especially those derived from unsaturated cycloaliphatic anhydrides by addition of halogen are not available commercially. Although several of the unsaturated cycloaliphatic anhydrides themselves are relatively inexpensive and are manufactured in commercial quantities, the preparation of the corresponding halo-addition compounds in a reasonably pure form is frequently time-consuming and cumbersome. Specifically the addition of halogen to olefinic double bonds in such cycloaliphatic compounds requires in some instances prior isomerization, proceeds rarely in quantitative yield, and can result in difficulty separable mixtures. Halogenated anhydrides of this type thus prove to be undesirably expensive as starting materials.

It has also been noted that the use of some brominated and iodinated unsaturated cycloaliphatic anhydrides in the above copolymerization results in some resinification and in objectional color development, particularly when aminoalcohols are employed as polymerization starters. Another undesirable feature which may occur to some extent with certain halogenated cycloaliphatic monoanhydrides is the elimination of hydrogen halide during the course of the copolymerization reaction. This type of side reaction represents a waste of reactants, reduces the halogen content of the final product and results in monofunctional byproducts which lower the average functionality of the copolymer. Since copolymers which incorporate such halogenated ring structures are very desirable for many applications, improvements in the preparation of such compositions would be highly desirable.

SUMMARY OF THE INVENTION

I have now discovered that the aforementioned disadvantages are completely eliminated by adding halogen not to the ethylenically unsaturated cycloaliphatic dicarboxylic anhydride but to the unsaturated copolymer prepared therefrom. Quite surprisingly, I have found that the addition of halogen to such an unsaturated copolymer proceeds smoothly and without cleavage of, or other undesirable interaction with, the polyether and polyacetal segments of the copolymer chains. The post-halogenation process of the present invention avoids any loss of raw materials due to side reactions and resinification, eliminates the disadvantages associated with the preparation of the halogenated monomer and results in polymers of good color.

The process of the present invention comprises the steps of (a) preparing an unsaturated binary or ternary copolymer by copolymerizing in the absence of strongly basic catalysts (1) a cyclic monoether selected from the group consisting of monoepoxides and monoxetanes, (2) an olefinically unsaturated cycloaliphatic monoanhydride, and mixtures thereof with cyclic monoanhydrides of the general formula

wherein R' is a hydrocarbon radical selected from the group consisting of saturated linear aliphatic radicals, unsaturated linear aliphatic radicals, saturated cycloaliphatic radicals and aromatic radicals, (3) from zero to about 50 percent by weight based on the weight of the reactant mixture of an aldehyde, and (4) from 0.1 to 75 percent by weight of the total reactant mixture of a polymerization starter selected from the group consisting of water, hydrogen-containing inorganic acids capable of effecting the ring-opening of cyclic monoethers without destructive decomposition, and organic compounds having at least one radical selected from the group consisting of hydroxyl, carboxyl and sulfhydryl radicals, and mixtures thereof, and (b) adding halogen to the olefinic double bond by intimately admixing the above copolymer, or a solution thereof, with a halogen compound, or a solution thereof, said halogen compound being selected from the group consisting of chlorine, bromine, iodine, interhalogen compounds, and organic complexes thereof, and maintaining the reaction mixture within a temperature range of about −30° to 100° C. until the reaction is completed.

DESCRIPTION OF THE PREFERRED EMBODIMENTS

The process of the present invention comprises two steps, copolymerization and addition of halogen, and is preferred for use in the preparation of halogenated copolymers, the polymer chains of which contain incorporated halo-substituted saturated cycloaliphatic ring radicals derived from the addition of halogen to olefinic cycloaliphatic polycarboxylic acid ester segments.

Anhydrides which are particularly useful in the first step of the process of the present invention comprise cyclic monoanhydrides of cycloaliphatic 1,2-dicarboxylic acids having from eight to fourteen carbon atoms and having at least one ethylenically unsaturated double bond. The double bond may be exocyclic or located within the cycloaliphatic ring. The most desirable copolymers are obtained from unsaturated cycloaliphatic cyclic monoanhydrides in which the double bond is located within the cycloaliphatic ring and is neither adjacent to nor in an allylic position to the anhydride group. Suitable anhydrides are generally readily available from the Diels-Alder addition reaction of a variety of dienes, such as butadiene, isoprene, cyclopentadiene, etc., to maleic anhydride. Examples of preferred anhydrides include among others cis-4-cyclohexene-1,2-dicarboxylic acid anhydride, also known as tetrahydrophthalic anhydride, trans-4-cyclohexene-1,2-dicarboxylic acid anhydride, 4-methyl-cis-4-cyclohexene-1,2-dicarboxylic acid anhydride, also known as methyl tetrahydrophthalic anhydride, methyl-trans-4-cyclohexene-1,2-dicarboxylic acid anhydride, endo-cis-bicyclo(2,2,1)-hept-5-ene-2,3-dicarboxylic acid anhydride or endo-cis-5-norbornene-2,3-dicarboxylic acid anhydride, also known and hereinafter referred to as Nadic anhydride, exo-cis-bicyclo(2,2,1)-hept-5-ene-2,3-dicarboxylic acid anhydride, methyl-bicyclo(2,2,1)-hept-5-ene-2,3-dicarboxylic anhydride isomers, also known and hereinafter referred to as Nadic Methyl Anhydride, and exo-cis-3,6-endoxo-1,2,3,6-tetrahydrophthalic anhydride (i.e. the addition product of furan and maleic anhydride). Anhydrides derived from the multiple addition of two or more moles of cyclopentadiene and one mole of maleic anhydride are also quite valuable. Mixtures of the above anhydrides with aromatic, heterocyclic and saturated and unsaturated linear aliphatic dicarboxylic acid cyclic monoanhydrides may be employed. Examples of useful anhydrides which can be admixed are maleic anhydride, itaconic anhydride, succinic anhydride, phthalic anhydride, tetrachlorophthalic anhydride, tetrabromophthalic anhydride, and 1,4,5,6,7,7-hexachlorobicyclo-(2,2,1)-hept-5-ene-2,3-dicarboxylic anhydride. Useful anhydride mixtures will contain at least ten, and advisably at least twenty, and more preferably at least thirty percent by weight of the unsaturated cycloaliphatic anhydride. Mixtures with maleic anhydride and phthalic anhydride are particularly preferred.

The cyclic ethers which are useful comprise 1,2-alkylene oxides, also known as epoxides or oxiranes, and 1,3-alkylene oxides, also known as oxetanes. The cyclic ethers may carry substituents which do not interfere with the polymerization, such as, for example: alkyl, aryl, alkylene, ether, ester, halo radicals and the like. Cyclic ethers containing an olefinic unsaturation capable of undergoing a cross-linking reaction under the process conditions, are, however, advisably excluded in the practice of this invention. Particularly suitable cyclic ethers are those having from two to twenty carbon atoms and from zero to three halogen substituents such as chloro or bromo radicals. Especially preferred for use in the present invention are the saturated aliphatic terminal 1,2-monoepoxides having from 2 to not more than twenty-one, and advisably not more than six, carbon atoms, and having the general structural formula

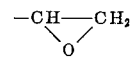

wherein the residual valence may be satisfied by hydrogen or by a radical selected from the group consisting of alkyl, cycloalkyl, aryl, alkaryl, and aralkyl radicals, and substituted such radicals, such a haloalkyl, alkylene, hydroxyalkyl, alkoxyalkyl, etc.

Representative of the terminal epoxides which can be used are ethylene oxide, propylene oxide, 1,2-butylene oxide, 1,2-hexylene oxide, styrene oxide, and epoxides derived from epoxidation of linear olefines, such as for example octadecene-1,2-epoxide. Examples of useful substituted epoxides are epichlorohydrin, epibromohydrin, allyl glycidyl ether, butadiene monoxide, vinyl-cyclohexene monoxide, ethyl epoxy oleate, glycidyl acrylate, glycidyl methacrylate, ethyl glycidyl ether, methyl glycidyl ether, and epoxides derived from terpenes by epoxidation such as pinene epoxide. In some instances glycidol is also useful.

Internal epoxides, such as 2,3-butylene epoxide may also be used although they may react at a somewhat slower rate and require longer reaction times.

Useful four-membered cyclic ethers comprise oxetanes and substituted oxetanes. Especially useful are oxetanes having from three to six carbon atoms and from zero to three halogen atoms selected from the group consisting of chloro and bromo radicals. Examples of useful four-membered cyclic ethers are trimethylene oxide or oxetane itself, and substituted oxetanes, such as 2-methyl oxetane, 3-methyl oxetane, 3,3-dimethyl oxetane, 2,4-dimethyl oxetane, 3,3-bis-(chloromethyl)-oxetane, and 3,3-bis-(bromomethyl)-oxetane.

The most preferred cyclic ethers for use in the invention are ethylene oxide and propylene oxide. Mixtures of cyclic ethers may be employed and are frequently useful.

For the preparation of terpolymers with acetal segments both mono- and polyfunctional aldehydes can be used in the process, and they can be aliphatic, alicyclic, aromatic or heterocyclic in nature. Both saturated and unsaturated aldehydes are useful. The lower aliphatic aldehydes (which includes formaldehyde) and the phenyl-substituted lower aliphatic aldehydes appear most suitable. Lower alkanals, lower alkenals, lower alkynals, phenyl-lower alkanals and phenyl-lower alkenals are subgeneric groups of aldehydes of especial interest in this invention. Preferred are those aldehydes having from one to 12 carbon atoms and from zero to three halogen substituents such as chloro- or bromo- radicals. Aldehydes which are at present considered to be particularly useful in the process are formaldehyde, acetaldehyde, benzaldehyde, trimethylacetaldehyde, terephthaldehyde, trichloroacetaldehyde, hereinafter called chloral, and tribromoacetaldehyde, hereinafter called bromal, as well as acrolein, crotonaldehyde and cinnamylaldehyde. Examples of other useful aldehydes include propionaldehyde, butyraldehyde, 2-ethyl hexaldehyde, isobutyraldehyde, isodecaldehyde, methacrolein, and tetrahydrofurfuraldehyde.

Monomeric aldehydes ares sometimes preferred for use as reactants. The aldehyde component may be introduced in the form of the cyclic aldehyde polymer, such as trioxane or paraldehyde, but it is not known whether the aldehyde reacts in the polymeric form or whether dissociation to the monomeric aldehyde takes place under the reaction conditions.

Especially preferred for use in the present invention are the lower aliphatic aldehydes having from one to six carbon atoms and from zero to three halogen atoms. These aldehydes are more reactive than the higher-molecular-weight aldehydes and combine more readily. Chloral and bromal are particularly useful in the production of polymers with flame-retardant properties because of their high halogen content, and their low cost.

Since the nomenclature applying to aldehydes and aldehyde polymers is not universally standardized, it should be noted that I have herein employed the nomenclature used in "Formaldehyde" by J. F. Walker, Reinhold Publishing Co. According to this reference, paraformaldehyde, or paraform, is a mixture of linear polyoxymethylene glycols containing 91–99 percent formaldehyde and generally has the formula HO—$(CH_2—O)_n$—H with n in the range of about 8–100. Also, in this reference the cyclic trimer of formaldehyde is called trioxane or trioxymethylene while the cyclic trimer of acetaldehyde is paraldehyde.

Compounds capable of starting the copolymerization are substances which contain one or more groups capable of forming ester, ether or acetal linkages. Suitable polymerization starters which can be used comprise the group consisting of water, inorganic acids capable of effecting the ring-opening reaction of cyclic ethers and anhydrides, and organic compounds having at least one active-hydrogen-containing radical selected from the group consisting of hydroxyl, carboxyl, and sulfhydryl radicals.

Water and inorganic acids capable of effecting the ring-opening reaction of cyclic ethers, and aqueous solutions thereof, may be employed as polymerization starters. Among the inorganic acids those containing hydrogen, and particularly the monomeric phosphorous-containing acids are preferred. Examples of hydrogen-containing inorganic acids which may serve as polymerization starters are hydrogen fluoride, hydrogen chloride, hydrogen bromide, hydrogen sulfide, hydrogen cyanide, arsenious acid, phosphorous acid, phosphoric acid, and boric acid. A phosphorous-containing or boron-containing polymerization starter is particularly useful when the final product should have flame-retarding properties. It is to be understood, however, that inorganic acids, such as nitric acid, which destructively decompose organic compounds, are advisably not employed. It is also frequently undesirable to use inorganic acids which form hydrolytically unstable ester linkages.

Useful organic polymerization starters are compounds containing one or more radicals selected from the group consisting of —OH, —COOH, and —SH radicals. Preferred for use are starters having at least two such radicals and especially preferred are starters having three or more such radicals. Organic starters may be saturated or unsaturated, and, in addition to hydroxyl, carboxyl, and sulfhydryl radicals, may contain other substituents, such as alkyl, ether, aryl, ester, cyano, and halo radicals, and the like, but these substituents should not be reactive with cyclic ethers and cyclic anhydrides under the process conditions. Useful organic polymerization starters comprise alcohols, etheralcohols, aminoalcohols, hydroxyalkyl esters, carboxylic acids, hydroxycarboxylic acids, phenols, mercaptans, thiocarboxylic acids, thiolcarboxylic acids, monosaccharides and polysaccharides. Particularly preferred for use are polymerization starters having alcoholic hydroxyl groups, such as aliphatic alcohols, aminoalcohols, and ether alcohols.

Polymerization starters may be used singly or mixtures of two or more starters may be employed. Water and aliphatic alcohols are especially desirable as components of such mixtures. Examples of particularly preferred combinations of starters are alcohol-water solutions, saccharide hydrates, alcoholic and aqueous solutions of saccharides, and mixtures of aliphatic polyalcohols with aminoalcohols. Examples of useful mixtures are water-polyol, and water-saccharide mixtures having from 1 to 80 percent by weight of water, and polyol-saccharide mixtures having from 5 to 90 percent by weight of polyol.

One very preferred group of polymerization starters consists of those having nonphenolic aliphatic hydroxyl groups. This group comprises aliphatic alcohols, ether alcohols, alkanolamines and saccharides. Aliphatic alcohols having from one to 18 carbon atoms and from one to eight hydroxyl groups, polyether glycols of from four to 15 carbon atoms, and alkanolamines having from four to 18 carbon atoms are especially preferred. Particularly preferred for use are the higher functionality aliphatic polyalcohols having from three to 15 carbon atoms and from three to eight hydroxyl groups.

Another preferred group of polymerization starters are the hydroxyl-terminated linear polyacetals, such as paraform, poly-acetaldehyde, and poly-trichloroacetaldehyde. Paraform is an especially preferred starter.

Representative alcoholic polymerization starters that can be used are mono- and poly-hydroxy-containing alcohols, such as methanol, ethanol, trichloroethanol, tribromoethanol, trifluoroethanol, propanol, butanol, pentanols, hexanol, stearyl alcohol, benzyl alcohol, allyl alcohol, methallyl alcohol, telomer alcohols, that is, free-radical adducts of methanol and tetrafluoroethylene, ethylene glycol, propylene glycol, butylene glycol, halohydrins, and cyanohydrins, that is alcohols having the structure

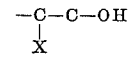

wherein X is selected from the group consisting of halo and cyano radicals, such as for example ethylene chlorohydrin, ethylene bromohydrin, ethylene cyanohydrin, dipropylene glycol, dibutylene glycol, diethylene glycol, triethylene glycol, tripropylene glycol, tetraethylene glycol, 1,12-octadecanediol, ethyl 12-hydroxystearate, glycerol, trimethylolethane, trimethylol propane, triricinolein (castor oil), pentaerythritol, dipentaerythritol, tripentaerythritol, sorbitol, xylitol, mannitol, erythritol, and inositol. An especially preferred alcoholic polymerization starter is a commercially available mixture of aliphatic polyols having from three to six carbon atoms and from three to six hydroxyl groups, and an average molecular weight of about 160 and an average equivalent weight of about 32.

Polymeric alcohols, such as for example polyvinyl alcohol and partially hydrolyzed polyvinylacetate, and polyether polyols having from three to eight hydroxyl groups and molecular weights ranging from about 100 to about 5,000, such as oxyethylene and oxypropylene adducts of polyols like glycerol or sorbitol, or of saccharides, like glucose, are also of value as polymerization starters.

Examples of useful alkanolamines are diethanolamine, diisopropanolamine, triethanolamine and hydroxyethers thereof, triisopropanolamine and hydroxyethers thereof, tetrakis(hydroxyethyl)ethylene diamine, tetrakis(hydroxypropyl)ethylene diamine, pentakis(hydroxyethyl)diethylene triamine, pentakis(hydroxypropyl)diethylene triamine, hexakis(hydroxyethyl)triethylene tetramine, hexakis (hydroxypropyl)triethylene tetramine, tris(hydroxyethyl)aminoethyl piperazine, and the like. Preferred alkanolamines and oxyalkylene alkanolamines are those having from four to 18 carbon atoms and an active hydrogen functionality of three or four. Mixtures of alkanolamines may be employed and especially useful are mixtures of a dialkanolamine and a trialkanolamine, and of a trialkanolamine with a tetrakis- or pentakis-alkanolamine. Mixtures of aliphatic polyalcohols having at least three hydroxyl groups with alkanolamines are also very useful.

Saccharides constitute another group of high-functionality starters. Suitable starters may be selected from the group consisting of monosaccharides, disaccharides, trisaccharides, higher polysaccharides having more than three monosaccharide residues per molecule, saccharide ether derivatives, also referred to as glucosides, saccharide hydrates and solubilized polysaccharide solutions.

Preferred for use are monosaccharides, disaccharides and trisaccharides having from five to 18 carbon atoms and from four to 11 hydroxyl groups. Especially preferred are monosaccharides and disaccharides. Examples of especially suitable compounds include among others dextrose, also known as glucose, xylose, sucrose, lactose, and maltose. Higher polysaccharides having more than three monosaccharide unit building blocks per molecule are also suitable. Examples of such higher polysaccharides are linear, branched and cyclic dextrins, such as alpha-cyclodextrin and beta-cyclodextrin, and polysaccharides of less well-defined composition, such as molasses, plant gums, mucilages, dextrans, pectins, corn syrup, and solubilized starches, such as solubilized corn starch, or potato starch, and the like. Products resulting from the modification and degradation of cellulose, such as partially esterified cellulose acetate may also be of value.

The polysaccharides are frequently used in combination with aliphatic polyalcohols. The polysaccharide should advisably be soluble or solubilizable in the aliphatic alcohol starter component and formation of a homogeneous polymerization starter mixture prior to reaction with the cyclic ether and the cyclic anhydride is frequently preferred. Very suitable polysaccharides are those having a solubility in water at 25° C. of at least 50 percent, and advisably at least 90 percent by weight. Polysaccharides without the requisite solubility may be solubilized by dispersing them in the aliphatic alcohol and heating this dispersion at a temperature of about 75° to about 200° C., and preferably of about 100° to about 180° C. for a period of time sufficient to bring about the formation of a gel, or preferably a viscous, clear, homogeneous solution. The length of time required will depend on the temperature and the components and will generally vary from as little as about 15 minutes up to about 24 hours or more.

Particularly preferred for use are the white corn dextrins, the canary corn dextrins, British Gums, cyclodextrins, corn starch, potato starch, and wheat starch. The proportion of polysaccharide in the polysaccharide-polyol starter mixture will generally range from about 5 percent to about 90 percent, and advisably to no more than 80 percent, and preferably from about 20 percent to about 60 percent by weight based on the weight of the combined starter mixture. These polyol-polysaccharide mixtures provide polymerization starters of extraordinarily high functionality, since the hydroxyl functionality of the polysaccharide component of the starter mixture may range from about 10 up to about 100,000, or even more.

Other useful saccharide starters are the simple and complex glucosides prepared by the reaction of a monosaccharide, such as glucose, or a polysaccharide, such as starch, corn syrup, dextrins and the like, with an alcohol selected from the group consisting of monofunctional aliphatic alcohols having from one to 18 carbon atoms, such as methanol, ethanol and the like, aliphatic glycols and ether glycols of from two to nine carbon atoms, such as ethylene glycol, propylene glycol, diethylene glycol and the like, and aliphatic polyalcohols having from three to six carbon atoms and from three to six hydroxyl groups, such as glycerol, sorbitol, and the like. The alcoholic compound may advantageously also possess carboxylic acid substituents and hydroxy-carboxylic acids having from two to six carbon atoms and from one to three hydroxyl groups and from one to three carboxylic acid groups, such as for example, glycolic acid, also known as hydroxyacetic acid, malic acid, citric acid, and hydroxyadipic acid are also valuable in preparing the glucoside starters.

Examples of readily available glucosides which are very suitable are alphamethyl glucoside and ethylene glycol diglucoside. Other glucosides are readily prepared by techniques known to the art, such as by reacting the monosaccharide with the alcoholic compound in aqueous solution. Techniques for the preparation of glucosides from the higher polysaccharides, such as starch, are also well known. Frequently degradation of the higher polysaccharides, such as starch, and formation of the glucoside are carried out simultaneously. This reaction generally requires an acidic catalyst, so that the use of a carboxy-functional alcohol is especially favorable in that an added catalyst may not be required. The use of hydroxyacetic acid is especially favorable in this embodiment.

As mentioned above, water has also been found to be a useful polymerization starter and it has been found that the hydrates of polyols and saccharides may also be used as well. Examples of useful hydrates are those of dextrose, maltose, lactose, raffinose, sorbitol, and others.

In another of the preferred embodiments of this invention, aqueous solutions of polyols and aqueous or alcoholic solutions of saccharides are used as polymerization starters. Specifically, the use of aqueous solutions of such compounds as sorbitol, and the use of aqueous or alcoholic solutions of such compounds as dextrose, sucrose, dextrins, gums and starches as polymerization starting materials constitutes a useful embodiment of this invention. The proportion of water or alcohol in such a starter solution will generally range from about 2 to about 98 percent by weight.

Examples of phenolic hydroxy-containing compounds which are useful are phenols having from six to 15 carbon atoms and from one to three phenolic hydroxyl groups, such as phenol, cresol, xylenol, resorcinol, catechol, phloroglucinol, and 2,2-bis(4-hydroxyphenyl)-propane. Polymeric compositions with phenolic hydroxyl groups may also be employed.

Organic carboxylic acids and hydroxy-carboxylic acids comprise another group of useful polymerization starters. Carboxylic acids which are preferred are those having from two to 54 carbon atoms and from one to four carboxylic acid groups, such as acetic acid, trichloroacetic acid, trifluoroacetic acid, propionic acid, butyric acid, perfluorobutyric acid, perfluorooctanoic acid, maleic acid, fumaric acid, succinic acid, adipic acid, stearic acid, tetrahydrophthalic acid, benzoic acid, methyltetrahydrophthalic acid, acrylic acid, methacrylic acid, linoleic acid, linoleic acid dimer, linoleic acid trimer, oleic acid, aconitic acid, isophthalic acid and tricarballylic acid. Other acids, such as pyromellitic acid, terephthalic acid and trimellitic acid may also be of value. Very preferred are aliphatic acids having from one to 18 carbon atoms.

Examples of hydroxy-carboxylic acids which have been employed are those having from two to 18 carbon atoms, from one to five hydroxyl groups and from one to three carboxyl groups, such as hydroxyacetic acid, citric acid, malic acid, tartaric acid, 12-hydroxystearic acid, ricinoleic acid and gluconic acid. Acidic natural products, such as gum copal, gum dammar and abietic acid may also be used. Other variable carboxylic acids can be used.

Sulfhydryl-group-containing compounds useful as polymerization starters comprise aliphatic mono- and polythiols, especially alkyl mercaptans containing from one to 12 carbon atoms, thiophenols, aliphatic thiol carboxylic acids and esters thereof with aliphatic polyols, and thiocarboxylic acids. Useful sulfhydryl starters will have from one to 24 carbon atoms, and from one to six sulfhydryl radicals. Examples of sulfhydryl compounds that may be employed include ethyl mercaptan, propyl mercaptan, butyl mercaptan, octyl mercaptan, monothio-, dithio-, and trithio-glycerol, alpha-mercaptoacetic acid, beta-mercaptopropionic acid, pentaerythritol-tetrakisbeta-mercaptopropionate, pentaerythritol-alpha-mercaptoacetate, glyceroltris-beta-mercaptopropionate, glycerol-tris-alpha-mercaptoacetate, sorbitol-beta-mercaptopropionate (various esters), and thiophenol and thiocresol. Thiokol-type polymers having free sulfhydryl groups and molecular weights of generally not more than 10,000 and sulfhydryl derivatives of cellulose may also be used.

The unsaturated copolymers are prepared in the first step of the process of the present invention by combining the cyclic ether, the unsaturated cycloaliphatic cyclic monoanhydride and the polymerization starter and heating them in intimate admixture at elevated temperature and pressure for a length of time sufficient to allow the copolymerization to proceed. The reaction can be effected batchwise, in a closed vessel, such as an autoclave equipped with agitation, or under continuous conditions in a tubular reactor at elevated temperatures and pressures. The reaction is conducted within a temperature range of at least about 50° to generally not more than 200° C., and frequently within a range of about 100° to 160° C. In a batch operation a temperature of 70° C. or higher is usually used although a temperature above 180° C., and advisably above 160° C. is generally not required and may lead to adverse results. In a continuous operation in which the residence times are very short, temperatures as high as 225° C., but advisably not more than 200° C. may be used. For best results the copolymerization is conducted at a temperature below that at which the condensation reaction between the alcoholic hydroxyl groups and the carboxylic acid groups resulting from the ring-opening reactions of the epoxide and anhydride employed, respectively, takes place to any significant extent. With some reactants the polymerization, once in progress, may become so exothermic as to require cooling to keep the reaction mixture within a suitable temperature range. For batch systems the most suitable temperatures for the process are about 100° to 180° C., and more preferably about 120° to 160° C. However, lower and higher temperatures can be used as warranted by the reactants employed. If saccharides are employed the reaction is preferably conducted within a temperature range of about 120° to 150° C. If strong acids such as phosphorous-containing acids are used as starting compounds, the temperature necessary to achieve copolymerization is considerably lowered. The polymerization of a few extremely reactive systems such as those using maleic acid and phosphoric acid as starters may proceed exothermically even at room temperature, and may require cooling.

The process of this invention is advisably conducted in a closed system at superatmospheric pressures. Superatmospheric pressure, such as autogeneous pressure is used although even higher pressures are very suitable in producing the copolymers. A minimum pressure of 1.5 atmospheres is advisably used. With the lower epoxides as reactants, the pressure under which the polymerization is conducted varies from about 50 pound per square inch (p.s.i.) to about 300 p.s.i. Because of the acidic nature of the reaction suitable equipment must be employed. Such materials as glass and 316 stainless steel have been found suitable for use in preparing these compositions. Other materials of sufficient corrosion resistance may be employed. Reaction times for completion of the copolymerization depend on the specific reactants and the reaction temperature and may range from a few minutes to several hours. Preferred are reaction times of less than 8, and more preferably less than 6 hours and frequently not more than 4 hours. In order to minimize any side reactions reaction times of more than 12 hours are advisably avoided. An inert atmosphere, such as nitrogen or argon, may desirably be employed with oxidation-sensitive reactants.

The process of this invention proceeds under inherently acidic conditions and does not require the use of a catalyst. However, strong acids have been found to act as catalysts and if strong acids, viz those which ionize at least as much as bromo-acetic acid, or anhydrides derived from strong acids are used as reactants, the process may become autocatalytic. The present process is inherently acidic since the cyclic carboxylic acid anhydride opens during the reaction to form an acid half-ester intermediate, thereby ensuring that carboxylic acid groups are present during the polymerization. If faster reaction rates are desired, catalysts of the type disclosed in U.S. Pat. No. 382,217, which is hereby included by reference, may be employed. Catalysts described therein comprise alkoxides, acylates and chelates of elements having an electronegativity value falling within the range of at least about 1.2 to generally not more than 2.6, such as for example titanium, vanadium, tin, chromium, manganese, iron, cobalt, nickel, boron, aluminum, copper, zinc, and others.

It should be noted in this regard that, in order to produce copolymers having ether segments of significant length, it is essential during the period in which unreacted free anhydride is present in the reaction mixture to avoid the presence of any strongly basic catalysts, such as quaternary ammonium hydroxides, inorganic hydroxides of alkali metals and alkaline earth metals, as well as salts and oxides of these metals and organic amines which exhibit strongly basic properties. The presence of trace amounts of such basic substances appears to alter the course of the reaction and, if the reactants are employed in the proportions set forth herein, results in simple polyesters with essentially no polyoxyalkylene segments and with much higher viscosities, plus unreacted cyclic ether. Thus, when reactants derived from natural sources are employed, they should advisably be low in content of basic ash.

An excess of cyclic ether over the amount stoichiometrically needed to react with the cyclic anhydride has to be used in the process. Without an excess of cyclic ether the polymerization does not go to completion in that not all of the anhydride reacts. At least a 50 percent stoichiometric excess of cyclic monoether is used, e.g. 1.50 moles of monoepoxide or oxetane per mol of anhydride. Usually at least a 100 percent stoichiometric excess of cyclic ether is used and to obtain the most desirable polymers at least 150 percent stoichiometric excess of monoepoxide to anhydride is employed. The mol ratio of cyclic monoether to anhydride is thus at least 1.50, advisably at least 2.00, and for best results at least about 2.50. The molar ratio of cyclic ether to anhydride will occasionally be as high as six, and will generally not be more than eight. The nature and amount of starter used should also be considered when selecting the ratio of epoxide to anhydride. The ratio of cyclic monoether to anhydride will generally be somewhat higher when acidic starters are used, and will generally be significantly lower when alkanolamines are used as starters.

After the polymerization is terminated any uncombined excess cyclic ether can be removed. Even though an excess of cyclic ether is used in the process, when careful control is exercised complete reaction of all components is achieved, and the final acid number can be as low or as high as desired. (The acid number of a polymer is defined as the milligrams of potassium hydroxide required to neutralize the acid end groups in 1000 grams of polymer.) If it is found that the resulting product has a higher acid number than desired, the epoxide content for the next run can be increased, as required, to lower the acid number to the level desired. The nature of the polymer chain end groups is thus easily controllable. The polymer chains will be terminated by either hydroxyl or carboxylic-acid groups and the total number of end groups will be equal to the sum of the two.

The copolymerization is advisably conducted in a manner such that a substantial concentration of the cyclic ether is present intimately admixed with the other reactants during the time in which the major part of the copolymerization reaction takes place. The presence of a substantial amount of cyclic ether in the reaction mixture during the reaction period in which most of the copolymerization takes place is an essential requirement in preparing the unsaturated copolymers. The reactants are advisably combined so that during the time in which at least 50 percent of the copolymerization takes place, the ratio of equivalents of cyclic ether to the sum of equivalents of acid groups plus one-half the equivalents of anhydride groups in the reaction mixture is at least 0.3. For purposes of this invention, one equivalent of cyclic ether is taken to be one mole of cyclic ether residue, and one equivalent of acid or anhydride is taken to be equal to that amount which is required to neutralize one mole of sodium hydroxide, e.g. one equivalent of an acid group is equal to one mol of carboxylic acid divided by the number of carboxylic acid groups per mol, and one mol of anhydride equals two equivalents, so that one-half the number of equivalents of anhydride present generally equals the number of mols present. This ratio of equivalents can be readily determined at any stage of the reaction by titration or other standard techniques known to the art. While it is frequently convenient to combine all the reactants initially before heating the reaction mixture, it is to be understood that the entire amount of cyclic ether or all of the anhydride does not have to be present at the start of the reaction, but that these reactants may be suitably added in several substantial, sizable portions by means of a few large batchwise additions during the course of the polymerization reaction. In order to effect the homopolymerization of the cyclic ether to polyether segments it is essential however, that the cyclic ether is not added in a large number of very small increments which would result in a very low concentration of cyclic ether while the reaction proceeds. Thus, the cyclic ether is advisably not added dropwise as the reaction proceeds because this mode of operation results in a minute instantaneous concentration of cyclic ether, and produces a pure polyester.

The important consideration in determining the amount of starter to be used is the ratio of the polymer equivalent weight desired to the starter equivalent weight. The equivalent weight of the starter is computed by dividing the starter molecular weight by the number of functional groups capable of starting the polymerization reaction. The equivalent weight of the polymer is computed by dividing the polymer molecular weight by the number of polymer chain-end groups. Thus the ratio of the weight of starter used to the total weight of the polymer formed is the same as the ratio of starter equivalent weight to the polymer equivalent weight.

Suitable amounts of polymerization starter employed in the process will range from about 0.1 percent to generally not more than 75 percent, and frequently not more than 50 percent by weight of the total reactant mixture. In general, larger amounts of higher-molecular-weight starting materials are used than those of lower molecular weight. When compounds of low molecular weight, such as water, or hydrogen sulfide, are used as starters the amount will generally not exceed 10 percent by weight of the total reactant mixture. In some instances involving starters of high equivalent weight, or polymers of low equivalent weight, the proportion of starter may exceed 50 percent by weight of the total reactant mixture. For example, if a low-molecular-weight polymer is formed by reacting an epoxide and an anhydride using stearyl alcohol as the starter, about 50 percent of the total polymer weight could be derived from the starter residue.

Unsaturated polyester-ether copolymers produced in the first step of the process of the present invention may be represented by the general formula

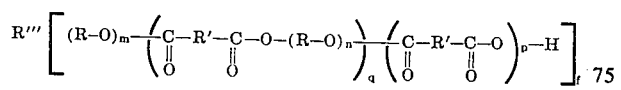

wherein R''' is the residue attached to the active hydrogens of a polymerization starter R'''(H)$_f$, and is derived therefrom, $f$ is the functionality, that is, the number of active hydrogens per molecule, $m$ is an integer varying from zero to about 10, $q$ is an integer with a value ranging from zero to about 100 with the average value of $q$ for the total composition being a number larger than zero, $p$ is an integer with a value of zero or one depending on whether the polymer chains are hydroxyl or carboxyl terminated, with the average value of $p$ being a number ranging from zero to one, $n$ is a positive integer varying substantially randomly from at least one to more than 10, with the average value of $n$ being a positive number ranging from at least 1.50, and more preferably at least 2, and frequently more than 2, to generally not more than eight, R is a hydrocarbon radical selected from the group consisting of 1,2-alkylene radicals and 1,3-alkylene radicals, and R' is a hydrocarbon radical selected from the group consisting of unsaturated cycloaliphatic hydrocarbon radicals and mixtures of unsaturated cycloaliphatic hydrocarbon radicals with aromatic and saturated and unsaturated linear aliphatic hydrocarbon radicals. For low-equivalent-weight compositions the average value of $q$ will vary from at least 0.1, and frequently at least 0.2, to about 0.9; for higher equivalent weight copolymers the average value of $q$ will be at least one and seldom more than 100.

The averages of $m$, $n$, and $q$ are arithmetic averages. The average value of $m$ can be computed by summing the number of —O—R— units in the polyether segments attached directly to the starter residues and dividing this sum by the total number of branch chains in the polymer. The average value of $n$ is computed by dividing the sum of the —O—R— units in the polyether segments not attached directly to the starter residues by the number of these polyether segments. The average value of $q$ is imputed by summing the number of polyester segments and dividing this sum by the total number of branch chains in the polymer.

Especially preferred compositions are those in which R is selected from the group consisting of 1,2-ethylene, 1,2-propylene, and 1,2-butylene and R' is selected from the group consisting of 1,2-cyclohexenylene, 4-methyl-1,2-cyclohexenylene, 2,3-norbornenylene, methyl-2,3-norbornenylene, and mixtures of these radicals with radicals selected from the group consisting of 1,2-ethylene, 1,2-ethenylene, 1,2-phenylene, tetrachloro-1,2-phenylene, tetrabromo-1,2-phenylene, and 1,4,5,6,7,7-hexachlorobicyclo-(2,2,1)-2,3-heptenylene-5.

If aldehydes are included in the copolymerization the compositions produced will additionally contain acetal segments.

In order to produce the halogenated compositions according to this invention these unsaturated copolymers are further reacted with elemental halogen or interhalogen compounds. Preferred for use are elemental bromine, iodine chloride, (ICl), iodine bromide, (IBr), and bromine chloride, (BrCl). Elemental chlorine and iodine may also be employed. Adducts of bromine or iodine and tertiary organic amines and other halogenation reagents known to the art are also useful. Most preferred for use is bromine, because of its ready availability, relatively low cost, ease of reaction and high level of flame retardancy imparted to the adducts.

The halogen addition reaction is generally not critical provided that the reaction temperature not be allowed to rise to a level high enough to promote undesirable side reactions, or color formation. In general, the addition reaction is an exothermic reaction and takes place spontaneously and in the absence of any catalysts, although suitable catalysts may be employed if desired. The halogen addition reaction is usually performed within a temperature range of about −30° to generally not more than about 70° C., and preferably at temperatures ranging from about 0° to about 50° C. It is frequently advisable to provide cooling to moderate the temperature rise resulting from the heat of the exothermic addition reaction. It is often desirable to carry out the addition reaction in an inert solvent, and both reactants, the unsaturated copolymer and the halogen compound, or either one alone may be used in solution. Thus it is not necessary for example to remove any excess cyclic ether from the unsaturated copolymer prior to addition of halogen as this excess of cyclic ether reactant can conveniently serve as solvent. Examples of other suitable inert solvents are halogenated hydrocarbons, such as methylene chloride, chloroform, carbon tetrachloride, fluorotrichloromethane, hexachloroethane, chlorobenzene, hydrocarbons, such as benzene, toluene, xylene, etc., alcohols, such as methanol, ethanol, butanol, etc., ethers, such as tetrahydrofuran, dioxane, etc., and others. If the halogenated copolymer is to be used as a component in the preparation of polyurethane foams, methylene chloride, and fluorotrichloromethane are often preferred for use as solvents since they are useful as blowing agents and need not be recovered. The mode of addition of the reactants does not appear to be critical. Thus the copolymer solution may be slowly added to the solution of halogen, or vice versa. The latter mode of addition is frequently preferred and the halogen solution is conveniently added dropwise to a stirred solution of the copolymer.

The interhalogen compounds useful in the process of this invention and their preparation and properties are described in detail by N. V. Sidgwick "The Chemical Elements and Their Compounds" Vol. II pp. 1146ff, Oxford at the Clarendon Press, 1951.

Generally at least 0.25 mol of halogen is employed per mol of unsaturated cycloaliphatic ring radical present in the copolymer. Use of more than 1.0 mols of halogen per unsaturated bond is generally inadvisable since the excess serves no useful purpose. The preferred ratio is 0.5 to 1.0 mols of halogen per mol of monounsaturated cycloaliphatic radical, and the most preferred ratio is 0.75 to 0.99 mols of halogen per mol of monounsaturated cycloaliphatic radical.

The compositions prepared by the instant process have halogen contents of at least about 10 percent by weight present as dihalocyclohexane dicarboxylic ester residues. The upper limit of halogen content is about 40 percent by weight of bromine, and 50 percent by weight of iodine. These halogen substituents are unexpectedly stable, and are relatively unaffected by strongly basic amine catalysts and elevated temperatures of 80°–125° C. present during the formation of a urethane foam. These properties contrast sharply with those of many bromine adducts known to the art, which rapidly eliminate HBr under such conditions, thereby neutralizing the catalyst, and preventing the foaming process from taking place normally. This stability in the presence of amino radicals is also important in that it makes possible stable halogenated polymers derived from alkanolamine starters.

Because of their content of flexibilizing ether segments and their narrow molecular weight distribution, the halogenated compositions prepared by the process of this invention possess relatively low viscosities. In addition, the polymers of this invention have lower viscosities than those of comparable polymers prepared directly from halogenated anhydrides such as Chlorendic anhydride.

The compositions prepared by the process of the present invention possess utility as polymeric plasticizers and as components and intermediates in the formation of a wide variety of polymeric and resinous compositions. For example, hydroxyl-terminated polyfunctional copolymers can be reacted with organic polyisocyanates to form flexible polyurethane foams, rigid polyurethane foams, polyurethane surface coatings and polyurethane castings; unsaturated copolymers in combination with unsaturated monomers and free-radical initiators form a variety of useful laminating and casting resins; carboxylic acid-terminated copolymers have been found to be useful in combination with epoxy resins to form cross-linked resinous compositions; and esterification of hydroxyl-terminated compositions with unsaturated fatty acids has resulted in useful air-drying surface coatings.

The process of this invention is especially useful for the preparation of halogenated polyols suitable for the preparation of flame-retardant polyurethane compositions. Suitable halogenated rigid polyurethane polyols will have equivalent weights ranging from about 100 to 300, and preferably from about 125 to 225, and viscosities ranging from about 10,000 centipoises to 1,000,000 centipoises at 25° C., depending on the equivalent weight and functionality. Halogenated flexible urethane polyols will have equivalent weights ranging from about 750 up to about 2000, and viscosities generally in the range of 100,000 centipoises up to perhaps 10,000,000 centipoises at 25° C.

When unsaturated cycloaliphatic anhydrides are employed in combination with maleic anhydride, halogen preferentially adds to the cycloaliphatic unsaturation leaving the maleic ester residues available for cross-linking reactions. Unsaturated copolymers containing maleic ester segments may desirably be subjected to isomerization conditions known to the art to convert the maleate ester residues into fumarate ester residues.

The following examples are presented to illustrate, but not to limit, the present invention:

EXAMPLE I

An unsaturated low-equivalent-weight triol was prepared from tetrahydrophthalic anhydride in the following manner: Into a 1-liter, stirred, heated, 316 stainless steel pressure vessel was placed 178.3 grams of 99.5 percent glycerol (containing about 0.5 percent water), 234.2 grams of tetrahydrophthalic anhydride, and 367 grams of propylene oxide. The vessel was sealed, heated to about 120°–130° C. and maintained at this temperature for 4 hours. The excess propylene oxide was then vented, and the product recovered. The product weighed 776 grams, was straw colored, and has a viscosity of about 26,000 centipoises at 63° F. The theoretical equivalent weight was 134.

The bromine adduct was prepared by mixing 20.4 grams of the above polyol with 48.8 grams of carbon tetrachloride, stirring the mixture and slowly adding 6.4 grams of bromine. The mixture was cooled during the addition. When the addition was complete, the carbon tetrachloride was removed under a water-pump vacuum. The resulting product was pale orange in color, had a bromine content of about 23 percent by weight, an equivalent weight of about 174, and a viscosity of 200,000 centipoises at 25° C.

The foam was prepared by mixing 10.2 grams of the above bromine adduct, 17.9 grams of a commercially available phosphate ester polyol having an average functionality of about five, and equivalent weight of 128, a phosphorous content of 5.6 percent by weight, and a viscosity of 2,500 centipoises at 25° C., 0.8 grams of a block copolymer of polyethylene oxide and dimethylsiloxane, 0.9 grams of a 20 percent solution of triethylenediamine in dimethylaminoethanol, and 14.1 grams of fluorotrichloromethane. The resulting mixture was clear. Then 30.1 grams of polyphenylene polyisocyanate were rapidly stirred in. The mixture creamed in 20 seconds, had a rise time of 120 seconds, and a tack-free time of 140 seconds. The resulting foam extinguished itself almost instantaneously when an igniting flame was removed.

EXAMPLE II

An unsaturated triol was prepared from the Diels-Alder adduct of cyclopentadiene and maleic anhydride. Into the 1-liter, stirred, heated, 316 stainless steel pressure vessel was placed 169.8 grams of 99.5 percent glycerol, 225.2 grams of the adduct of cyclopentadiene and maleic anhydride (endomethylene tetrahydrophthalic anhydride), and 375 grams of propylene oxide. The vessel was sealed and then heated to 120°–130° C. and maintained at this temperature for 5 hours and 20 minutes. Then the excess propylene oxide was vented and the product recovered. The product weighed 651 grams, had a viscosity of about 10,000 centipoises at room temperature, an equivalent weight of 117 and an acid number of 4. It was pale straw in color.

The bromine adduct of this polyol was prepared by mixing 21.2 grams of this polyol in 40.3 grams of carbon tetrachloride. Then 6.4 grams of bromine were added slowly. The addition was fast, but not instantaneous. The mixture warmed to about 50° C. during the addition. Then the mixture was vacuum stripped under a water-pump vacuum to about 80° C. The product had a bromine content of about 23 percent by weight and an equivalent weight of 152. The polyol was pale amber in color, and had a viscosity of about 20,000 centipoises at 25° C.

EXAMPLE III

Iodine monobromide was prepared by mixing 15.2 grams of bromine and 18.3 grams of iodine. The mixture first formed a solution, and then deposited crystals of IBr.

20.3 grams of the triol of example II was mixed with 36.8 grams of carbon tetrachloride and shaken to form a fluid, 2-phase mixture. Then 8.8 grams of IBr crystals were slowly added, the decolorization of the solution becoming distinctly slow as the final increments of IBr were added. The solution was then stripped under a water-pump vacuum to about 80° C. The resulting polyol had an equivalent weight of about 168, a halogen content of about 30 percent by weight, and physical properties similar to those of the bromine adduct of example II.

This example was repeated, using 7.0 grams of iodine monochloride in place of the iodine monobromide. The results were quite similar.

EXAMPLE IV

An unsaturated polyester-ether was prepared from maleic anhydride and the Diels-Alder adduct of cyclopentadiene and maleic anhydride. Into the 1-liter, 316 stainless-steel pressure vessel was added 28.0 grams of fumaric acid, 91.8 grams of maleic anhydride, 102.0 grams of the crystalline Diels-Alder adduct of cyclopentadiene and maleic anhydride, and 215 grams of propylene oxide. The vessel was sealed and heated to 140°-150° C. for 2½ hours. At the end of this time there was no pressure present in the vessel. The temperature was then raised to about 170° C. for 1¼ hours and about 200° C. for 2¾ hours. The vessel was then cooled, 150 grams of propylene oxide were added, and the vessel was resealed. It was then heated to about 120°-125° C. for 1½ hours. The excess epoxide was then vented, and the product recovered. The product weighed 444 grams and was pale straw in color.

26.0 grams of the above product was mixed with 18.5 grams of carbon tetrachloride, and the mixture was heated to solution. The solution was then cooled to about 30° C. and 5.9 grams of bromine was slowly added. Decolorization was still taking place at an appreciable rate at the end of the addition. The solution was then stripped under a water-pump vacuum. A mixture was prepared of 20.7 grams of the stripped adduct, 8.0 grams of styrene, 0.1 grams of a 15 percent solution of paraffin wax in heptane, 0.05 grams of 6 percent cobalt octoate, and 0.35 grams of methylethylketone peroxide. The mixture had about gelled after 35 minutes and was tack free in 1 hour. After standing overnight, the casting had hard to the touch and was self-extinguishing after removal of an igniting flame.

EXAMPLE V

A polyol of 4-methyl tetrahydrophthalic acid was prepared from the crystalline adduct of isoprene and maleic anhydride. Into the 1-liter, 316 stainless steel pressure vessel was placed 29.5 grams of 4-methyl tetrahydrophthalic anhydride, 25.0 grams of trimethylolpropane, and 121 grams of propylene oxide. The vessel was then sealed and heated to about 100°-120° C. for 3½ hours. The excess epoxide was vented, and the product recovered. The product was straw in color, weighed 94.6 grams, and had a viscosity of about 10,000 centipoises at 25° C.

26.5 grams of the above product was mixed with 52.3 grams of carbon tetrachloride, and the mixture was stirred to form a clear solution. Then 7.5 grams of bromine were slowly added, originally becoming decolorized at a rapid rate, but with the rate of decolorization becoming quite slow during the addition of the final one-half gram of bromine. The solution was then devolatilized under a water-pump vacuum to a temperature of about 80° C. The product weighed 34.9 grams, was amber in color and had a viscosity of about 20,000 centipoises at 25° C.

EXAMPLE VI

A polyol of Methyl Nadic anhydride was prepared from the commercially available Diels-Alder adduct of methyl cyclopentadiene and maleic anhydride. Into a 1-liter, 316 stainless steel pressure vessel was placed 30.3 grams of 99.5 percent glycerol, 39.0 grams of Methyl Nadic anhydride, and 62 grams of propylene oxide. The vessel was sealed and heated to 110°-130° C. and maintained in this temperature range for 5½ hours. The excess epoxide was then vented and the product recovered. The product weighed 99.5 grams, was strawcolored, and had a viscosity of about 100,000 centipoises at 25° C.

In a 100 ml. flask was placed 22.0 grams of the above product, 58.1 grams of carbon tetrachloride, and the two components were stirred to form a rather fluid heterogeneous mixture. Then 6.0 grams of bromine were slowly added. The decolorization of the bromine became slow near the end of the addition of the 6.0 grams. There was no noticeable evolution of HBr. Then the mixture was devolatilized under a water-pump vacuum to a temperature of about 70° C. The product was amber in color.

EXAMPLE VII

This example illustrates the preparation of a brominated polyester-ether-acetal. First, paraformaldehyde having an assay of 91-92 percent formaldehyde was vacuum dried at about 1 mm. pressure in a vacuum dessicator overnight. Then in a Carius bomb tube was placed 4.8 grams of the dried paraformaldehyde, 4.2 grams of tetrahydrophthalic anhydride and 4.2 grams of propylene oxide. The tube was sealed and heated in a 170° C. oven for 1 hour, with shaking after the first 10 minutes to achieve solution. Then the tube was removed and cooled. The product was a viscous, canary yellow fluid. The tube was opened and the product transferred to a 100 ml. flask. The product was then vacuum stripped under a water-pump vacuum to a temperature of about 120° C. to remove unreacted starting materials. Then 21.3 grams of methylene chloride were added, and the mixture shaken to form a solution. Then 4.4 grams of bromine were slowly added, with the final decolorization becoming noticeably slow. The product was then vacuum stripped under a water-pump vacuum to about 75° C. The product was amber, and viscous.

I claim:

1. In the process of preparing copolymers by copolymerizing in the absence of strongly basic catalysts at superatmospheric pressures and at a temperature ranging from about 70° to about 180° C. (1) a cyclic monoether selected from the group consisting of monoepoxides and monooxetanes, a cyclic monoanhydride selected from the group consisting of anhydrides of olefinically unsaturated cycloaliphatic polycarboxylic acids and mixtures thereof with cyclic anhydrides of the general formula

wherein R′ is a hydrocarbon radical selected from the group consisting of saturated acyclic aliphatic radicals, unsaturated acyclic aliphatic radicals, saturated cycloaliphatic radicals and aromatic radicals. (3) from 0.1 to 75 percent by weight of the total reactant mixture of a polymerization starter selected from the group consisting of water, hydrogen-containing inorganic acids capable of effecting the ring-opening of cyclic monoethers without destructive decomposition, and organic compounds having at least one radical selected from the group consisting of hydroxyl, carboxyl and sulfhydryl radicals, and mixtures thereof, and (4) from zero to 30 percent by weight based on the weight of the reactant mixture of a catalyst selected from the group consisting of inorganic esters of alcohols having from one to 18 carbon atoms, salts of carboxylic acids having from two to 54 carbon atoms and acetylacetonates of elements selected from the group consisting of aluminum, titanium, zirconium, boron, antimony, tin, zinc, cobalt, nickel, and vanadium, with the mol ratio of said cyclic monoether to said cyclic monoanhydride being at least 1.5, the improvement which consists of employing a two-step process in which halogen is added to the formed unsaturated copolymer by intimately admixing the unsaturated copolymer with a halogen compound selected from the group consisting of chlorine, bromine, iodine, interhalogen compounds and (organic complexes thereof) adducts of tertiary organic amines and bromine, and maintaining the reaction mixture within a temperature range of about −30° to 100° C. until the halogen addition is completed.

2. The process of claim 1 in which said halogen compound is employed in the form of a solution in an inert solvent.

3. The process of claim 1 in which said unsaturated copolymer is employed in the form of a solution in an inert solvent.

4. The process of claim 3 in which said solvent is a hydrocarbon.

5. The process of claim 1 in which said halogen compound is bromine.

6. The process of claim 5 in which said cyclic ether is a monoepoxide selected from the group consisting of ethylene oxide, propylene oxide, 3-chloro-1,2-propylene oxide, 3-bromo-1,2-propylene oxide, and said unsaturated cycloaliphatic monoanhydride has from eight to 14 carbon atoms and one olefinic double bond.

7. The process of claim 6 in which said anhydride is tetrahydrophthalic anhydride.

8. The process of claim 6 in which said anhydride is methyltetrahydrophthalic anhydride.

9. The process of claim 6 in which said anhydride is endo-cis-5-norbornene-2,3-dicarboxylic anhydride.

10. The process of claim 6 in which said anhydride is Methyl Nadic anhydride.

11. The process of claim 6 in which said anhydride is the polycyclic adduct of two mols of cyclopentadiene and one mol of maleic anhydride.

12. The process of claim 1 in which said anhydride is a mixture of maleic anhydride and an unsaturated cycloaliphatic anhydride selected from the group consisting of tetrahydrophthalic anhydride, methyltetrahydrophthalic anhydride, endo-cis-5-norbornene-2,3-dicarboxylic anhydride, and Methyl Nadic anhydride, said (1) is a monoepoxide selected from the group consisting of ethylene oxide, propylene oxide, 3-chloro-1,2-propylene oxide, 3-bromo-1,2-propylene oxide, and 1,2-butylene oxide, said halogen compound is bromine.

13. The process of claim 1 in which said halogen compound is chlorine.

14. The process of claim 1 in which said halogen compound is bromine.

15. The process of claim 1 in which said halogen compound is an interhalogen compound.

16. The process of claim 1 in which said halogen compound is an adduct of bromine and a tertiary organic amine.

17. The process of claim 2 in which said solvent is a halogenated hydrocarbon.

18. The process of claim 15 in which said interhalogen compound is iodine bromide.

19. The process of claim 15 in which said interhalogen compound is iodine chloride.

20. The process of claim 15 in which said interhalogen compound is bromine chloride.

* * * * *